2,738,063

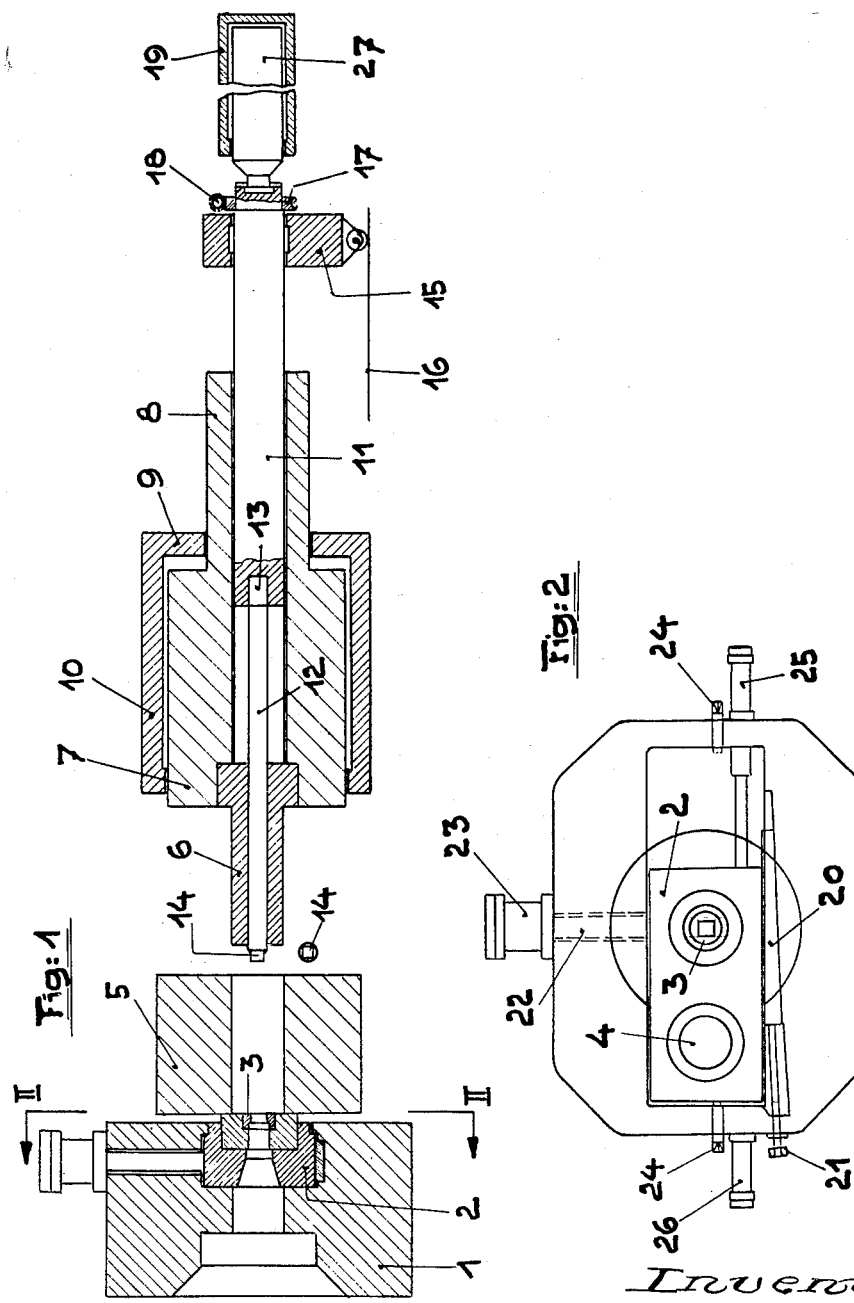

Patented Mar. 13, 1956

2,738,063

DEVICE FOR INDEXING THE DIE APERTURES ON EXTRUSION PRESSES

Peter Billen, Leverkusen-Kuppersteg, Germany, assignor to Schloemann Aktiengesellschaft, Dusseldorf, Germany Application December 30, 1952, Serial No. 328,615

Claims priority, application Germany January 10, 1952

3 Claims. (Cl. 207—3)

The present invention relates to an extrusion press of the type producing hollow sections.

More particularly this invention relates to improvements in such presses for producing acircular or noncylindrical hollow sections.

Accordingly the invention has for an object to improve such presses by incorporating therewith adjusting and indexing mechanisms for coinciding and aligning an acircular die with a mandrel having at least an acircular end portion that cooperates with the die during extrusion.

The invention solves the problem by having the mandrel mounted rotatably in such a manner that its rotation enables it to be indexed. This arrangement possesses the advantage of enabling the device intended for rotating and fixing (i. e., indexing) the mandrel to be set up at a point where ample room is available.

It is advantageous to guide the mandrel, equipped with the profiled point, through the press stem and press piston by means of a cylindrical stem and to equip its rear end with an indexing device enabling it to be turned and fixed, e. g. a worm drive.

In a preferred form of construction, a tubular extension fixed to the press piston is guided through the closed end of the press cylinder; in this extension is located, capable of axial and rotary movement, a mandrel-holding rod forming the rear extension of the mandrel. The rear end of this rod is guided along a fixed track and can accommodate the indexing device—e. g. worm drive—for rotating and fixing the mandrel, as well as a hydraulic piston for shifting the mandrel longitudinally.

The device serving to place the die orifice axis in exact alignment with the mandrel axis is best set up, according to the invention, near the die. A second boring may be let into a die holder, shiftable at right angles to the press axis; this boring makes possible, after shifting the die holder in a lateral direction, the ejection of seized blocks on the one hand, whilst on the other, it can serve to accommodate a second die, so that in alternating cycles of work with two dies, the one lying to one side of the press axis is always accessible and may be cleansed during the following working stroke. This arrangement facilitates a rapid sequence of individual extrusions. In order to carry out the adjustment of the die holder transversely of the matrix in its other direction at right angles to its abovementioned displacement correctly and simply, according to an additional modification a parallel displacement of a guiding surface of the die holder is attained by displacing a wedge gib between the abutting surface of the frame and the guiding surface of the die holder. Thereupon the die holder is pressed on the other side, e. g., the upper side, after adjustment of the wedge gib in constrained relation against the guide path of the wedge gib. This force-locking can be effected by a pressure piston.

Further and more specific objects will be apparent from the following description taken in connection with the accompanying drawing in which:

Figure 1 is a vertical longitudinal sectional view diagrammatically illustrating the essential elements of the press in accordance with the invention, and Figure 2 is an end elevation as viewed in the direction of the arrows on lines II—II of Figure 1.

The extrusion press includes a frame or housing 1 having a bore through which the extruded section passes. Movably mounted in the frame is a die holder 2 which by means hereinafter described can be shifted laterally relative to the axis of the press. The die holder carries an extrusion die 3 having an acircular orifice and as shown in Figure 2 is provided with an opening 4 which can accommodate either a second die or after the die holder 2 has been moved laterally to align the opening 4 with the press axis can serve for the ejection of a block or ingot. In front of the die holder 2 is mounted a hollow material receiver 5, the axis of which constitutes the press axis. Coaxial with the receiver is mounted the press cylinder 10. This cylinder has an open end directed toward the receiver and a remote end 9 having an aperture therethrough. Slidably mounted within the cylinder is the press piston 7 having a tubular extension on the end remote from the receiver that is guided in the aperture in the end or bottom 9 of the cylinder. A hollow press ram 6 is carried by the end of the piston 7 that is adjacent the receiver. The press ram 6 is firmly fixed to the piston 7 and during extrusion it forces material from the receiver through the die.

Mandrel means including a mandrel rod 12 in threaded engagement as at 13 with a mandrel supporting rod 11 are accommodated within the aligned press ram, press piston and tubular extension. The end of the mandrel rod 12 adjacent the die has an acircular end, in the illustrated instance a square cross-section as denoted at 14. The total lengths of rods 11 and 12 is greater than the combined length of the press ram, press piston and tubular extension whereby a portion of the rod 11 extends beyond the end of the extension 8. Both rods 12 and 11 are cylindrical so that their axis coincides with the axis of the receiver 5. The remote end of the mandrel holding rod 11 has associated therewith a piston 27 slidably mounted in a cylinder 19. By suitable actuation of this piston, the mandrel 12 can be moved toward the die and the mandrel can have this axial movement independent of the movement of the press piston and press ram. Operably associated with the mandrel means on that portion of the holding rod 11 that projects beyond the tubular extension of the press piston is a mechanism for rotatably adjusting the mandrel relative to the die so as to dispose the sides of the square 14 in parallelism with similar surfaces on the interior of the die. In other words, this mechanism rotatably adjusts the mandrel to dispose its acircular end in coincidence with the acircular orifice of the die. The adjusting mechanism illustrated includes a carriage 15 movable along a track 16 that is parallel to the press axis. The carriage supports the mandrel holding rod 11 for rotation about its axis. On the portion of this rod adjacent the piston 27 is a worm gear 17 which is engaged by a worm wheel 18 carried by the carriage. Suitable means not shown rotate the worm 18 to in turn rotatably adjust the mandrel means. Utilizing an interengaging worm and worm gear provides an arrangement in which the mandrel is locked in its rotatably adjustable position and thus properly indexed relative to the die.

The die holder is likewise adjustable relative to the frame 1 so that the axis of the die can be radially adjusted relative to the fixed axis of the mandrel. To accomplish these adjustments, the die holder 2 in addition to being laterally adjustable along the slideway formed in the frame 1 can be elevated vertically by a wedge 20. This wedge 20 can be moved horizontally along an inclined ramp by a set-screw 21. The lateral movement of the die holder 2 is effected by oppositely disposed piston and cylinder means 25 and 26 respectively. Adjustable stop screws 24 are provided in each side end of the frame 1 for regulating the lateral movement of the die holder. By moving the wedge 20 inwardly, the die holder 2 is raised vertically and to lock the die holder in its vertically adjusted position there is provided a piston 22 movable in a cylinder 23. The piston 22 moves in a bore in the frame 1 and extends perpendicular to the wedge and this piston cooperates with the side of the die holder opposite the wedge.

It is, therefore, clear that the present invention provides in an extrusion press, an extrusion die having an acircular orifice, a plunger for pressing material through the die, a mandrel having at least an acircular end for cooperation with the die in an extruding operation, means for supporting and moving the mandrel relative to the die along a fixed axis and for holding the mandrel axially fixed relative to the die during extrusion and means for rotatably adjusting the mandrel relative to the die to dispose the acircular end of the mandrel in coincidence with the die. The invention further provides means for radially adjusting the die relative to the axis of movement of the mandrel.

What I claim is:

1. In an extrusion die having an extrusion press, an acircular orifice, a plunger mounted for movement toward and away from the die for pressing material through the die, a mandrel having at least an acircular end for cooperation with the die orifice during an extruding operation, means supporting the mandrel for reciprocatory movement along a fixed axis relative to the die, means for reciprocating the mandrel and for holding the same axially fixed adjacent the die during extruding, means for radially adjusting the die relative to said fixed axis and means for rotatably adjusting the mandrel relative to the die to dispose the acircular end of the mandrel in coincidence with the acircular orifice of the die.

2. In an extrusion press, an extrusion die having an acircular orifice, a plunger mounted for movement toward and away from the die for pressing material through the die, a mandrel having at least an acircular end for cooperation with the die orifice during an extruding operation, means supporting the mandrel for reciprocatory movement along a fixed axis relative to the die, means for reciprocating the mandrel and for holding the same axially fixed adjacent the die during extruding, a movable die holder supporting said die, means for moving said die holder in opposite directions along a line perpendicular to a vertical plane passing through said fixed axis, opposed hydraulically actuated piston means operably associated with said die holder for adjusting the die holder and thus the die in one direction perpendicular to said fixed axis, movable wedge means operably associated with said die holder for adjusting the same in another direction perpendicular to said axis, hydraulically actuated clamp means for holding said die holder in the position to which it was moved by said wedge means and means for rotatably adjusting the mandrel relative to the die to dispose the acircular end of the mandrel in coincidence with the acircular orifice of the die.

3. In an extrusion press, a frame having an aperture therethrough, an extrusion die having an acircular orifice supported in the frame, a material receiver supported adjacent the die, a press cylinder having an open end directed toward and in alignment with said receiver, said cylinder including a remote end having a centrally disposed aperture therethrough, a hollow piston slidable in said cylinder and including a tubular extension slidable through the aperture in the remote end of the cylinder, a hollow press ram carried by said piston, directed toward said receiver and movable therein to force material from the receiver through the die orifice, mandrel means extending through the said ram, piston and tubular extension, said mandrel means having an acircular end for cooperation with the die orifice during an extruding operation and a portion disposed beyond the extension of said cylinder, means for moving the mandrel means along the fixed axis of and relative to the ram, the receiver and the die to position the mandrel means adjacent the die orifice during an extruding operation and to withdraw the mandrel means away from the die, said last mentioned means holding the acircular end of the mandrel means axially fixed relative to and adjacent the die orifice during extruding, a movable die holder supporting said die in said frame, means for moving the die holder radially of said axis to adjust the position of the die relative to the axis of the mandrel, a carriage rotatably supporting the portion of the mandrel means disposed beyond said extension, means guiding the carriage for movement toward and away from the die, and means carried in part by said carriage and in part by the said portion of the mandrel means for rotatably adjusting the mandrel means relative to the die to dispose the acircular end of the mandrel means in coincidence with the acircular orifice of the die.

References Cited in the file of this patent

UNITED STATES PATENTS

| 525,197 | Fox | Aug. 28, 1894 |
| 1,924,522 | Sparks | Aug. 29, 1933 |
| 1,935,286 | Born | Nov. 14, 1933 |
| 2,256,545 | Bothmann | Sept. 23, 1941 |
| 2,533,942 | Jongedyk | Dec. 12, 1950 |

FOREIGN PATENTS

| 23,176 | Germany | Aug. 11, 1883 |
| 684,794 | Germany | Dec. 5, 1939 |